(12) United States Patent
Aimu et al.

(10) Patent No.: US 9,461,312 B2
(45) Date of Patent: Oct. 4, 2016

(54) ELECTRODE FOR FUEL CELL, MANUFACTURING METHOD OF ELECTRODE FOR FUEL CELL, POLYMER ELECTROLYTE FUEL CELL AND CATALYST INK

(75) Inventors: Masanori Aimu, Susono (JP); Randal Lewis Perry, Hockessin, DE (US); Mark Gerrit Roelofs, Earleville, MD (US); Robert Clayton Wheland, Wilmington, DE (US); Ralph Munson Aten, Chadds Ford, PA (US); Andri E. Elia, legal representative, Chadds Ford, PA (US)

(73) Assignees: TOYOTA JIDOSHA KABUSHIKI KAISHA, Toyota-Shi (JP); E.I. DUPONT DE NEMOURS AND COMPANY, Wilmington, DE (US)

( * ) Notice: Subject to any disclaimer, the term of this patent is extended or adjusted under 35 U.S.C. 154(b) by 174 days.

(21) Appl. No.: 14/237,102

(22) PCT Filed: Aug. 7, 2012

(86) PCT No.: PCT/JP2012/005017
§ 371 (c)(1),
(2), (4) Date: Feb. 4, 2014

(87) PCT Pub. No.: WO2013/021627
PCT Pub. Date: Feb. 14, 2013

(65) Prior Publication Data
US 2014/0377689 A1 Dec. 25, 2014

(30) Foreign Application Priority Data
Aug. 9, 2011 (JP) ................. 2011-174041

(51) Int. Cl.
*H01M 2/00* (2006.01)
*H01M 4/90* (2006.01)
(Continued)

(52) U.S. Cl.
CPC ......... *H01M 4/9075* (2013.01); *H01M 4/8605* (2013.01); *H01M 4/8668* (2013.01);
(Continued)

(58) Field of Classification Search
CPC .......... H01M 4/2605; H01M 4/8668; H01M 4/881; H01M 4/9075; H01M 4/882; H01M 2008/1095; H01M 4/8828; Y02E 60/50
See application file for complete search history.

(56) References Cited

U.S. PATENT DOCUMENTS

2004/0028992 A1  2/2004  Jaouen
2009/0061277 A1  3/2009  Sayre et al.
(Continued)

FOREIGN PATENT DOCUMENTS

CN  1471740 A  1/2004
JP  2003-36856 A  2/2003
(Continued)

*Primary Examiner* — Cynthia H Kelly
*Assistant Examiner* — Monique Wills
(74) *Attorney, Agent, or Firm* — Kenyon & Kenyon LLP

(57) ABSTRACT

An electrode (31c) for fuel cell comprises: a catalyst carrier (110) that is an electrically-conductive carrier (130) with a catalyst (120) supported thereon; a first electrolyte resin (141); and a second electrolyte resin (142). The first electrolyte resin has oxygen permeability of less than $2.2 \times 10^{-14}$ mol/(m s Pa) in an environment having temperature of 80 degrees Celsius and relative humidity of 50%. The second electrolyte resin has oxygen permeability of not less than $2.2 \times 10^{-14}$ mol/(m s Pa) in the environment having temperature of 80 degrees Celsius and relative humidity of 50%.

8 Claims, 10 Drawing Sheets

(51) Int. Cl.
*H01M 4/86* (2006.01)
*H01M 4/88* (2006.01)
*H01M 8/10* (2016.01)

(52) U.S. Cl.
CPC ........... *H01M4/8828* (2013.01); *H01M 4/881* (2013.01); *H01M 4/8882* (2013.01); *H01M 2008/1095* (2013.01); *Y02E 60/50* (2013.01)

(56) References Cited

U.S. PATENT DOCUMENTS

2009/0239114 A1* 9/2009 Kouno ................ H01M 8/1023
429/487

2012/0189941 A1* 7/2012 Kurata ................ H01M 4/8652
429/480

FOREIGN PATENT DOCUMENTS

| JP | 2003-282073 A | 10/2003 |
| JP | 2009-245932 A | 10/2009 |
| JP | 2010-262896 A | 11/2010 |
| JP | 2011113739 A | 6/2011 |
| JP | 2011-175881 A | 9/2011 |
| JP | 2011-181344 A | 9/2011 |
| WO | 02/37585 A1 | 5/2002 |
| WO | 0235633 A1 | 5/2002 |

* cited by examiner

| CATALYST INK | MASS RATIO OF ELECTROLYTE RESIN TO ACETYLENE BLACK (I/C) | | MASS FRACTION OF GENERAL-TYPE ELECTROLYTE RESIN TO TOTAL MASS OF ELECTROLYTE RESIN COMPONENT [%] |
|---|---|---|---|
| | GENERAL-TYPE ELECTROLYTE RESIN | HIGH OXYGEN-PERMEABLE ELECTROLYTE RESIN | |
| A | — | 0.75 | 0 |
| B | 0.015 | 0.735 | 2 |
| C | 0.0375 | 0.7125 | 5 |
| D | 0.075 | 0.675 | 10 |
| E | 0.15 | 0.60 | 20 |
| F | 0.375 | 0.375 | 50 |
| G | 0.60 | 0.15 | 80 |

0wt%  0.3mg-Pt/cm²

2wt%  0.3mg-Pt/cm²

5wt% 0.3mg-Pt/cm²

10wt% 0.3mg-Pt/cm²

0wt%  0.2mg-Pt/cm²

2wt%  0.2mg-Pt/cm²

| CATALYST INK | MASS FRACTION OF GENERAL-TYPE ELECTROLYTE RESIN TO TOTAL MASS OF ELECTROLYTE RESIN COMPONENT[%] | ELECTRODE SURFACE CONDITION |
|---|---|---|
| A | 0 | × |
| B | 2 | △ |
| C | 5 | ○ |
| D | 10 | ○ |
| E | 20 | ○ |
| F | 50 | ○ |
| G | 80 | ○ |

| CATALYST INK | MASS FRACTION OF GENERAL-TYPE ELECTROLYTE RESIN TO TOTAL MASS OF ELECTROLYTE RESIN COMPONENT [%] | POWER GENERATION CAPABILITY (CELL VOLTAGE) [V] |
|---|---|---|
| A | 0 | 0.61 |
| B | 2 | 0.615 |
| C | 5 | 0.62 |
| D | 10 | 0.635 |
| E | 20 | 0.59 |
| F | 50 | 0.55 |
| G | 80 | 0.47 |

EQUIVALENT CIRCUIT Z

| CATALYST INK | MASS FRACTION OF GENERAL-TYPE ELECTROLYTE RESIN TO TOTAL MASS OF ELECTROLYTE RESIN COMPONENT [%] | POWER GENERATION CAPABILITY (CELL VOLTAGE) | ELECTRODE SURFACE CONDITION |
|---|---|---|---|
| A | 0 | ○ | × |
| B | 2 | ○ | △ |
| C | 5 | ○ | ○ |
| D | 10 | ○ | ○ |
| E | 20 | ○ | ○ |
| F | 50 | × | ○ |
| G | 80 | × | ○ |

ELECTRODE FOR FUEL CELL, MANUFACTURING METHOD OF ELECTRODE FOR FUEL CELL, POLYMER ELECTROLYTE FUEL CELL AND CATALYST INK

CROSS REFERENCE TO RELATED APPLICATIONS

This is a national phase application based on PCT International Patent Application No. PCT/JP2012/005017, filed on Aug. 7, 2012, claiming priority to Japanese Patent Application No. 2011-174041, filed on Aug. 9, 2011, the entire contents of both of which are incorporated herein by reference.

TECHNICAL FIELD

This invention relates to an electrode for fuel cell, a manufacturing method of an electrode for fuel cell, a polymer electrolyte fuel cell and a catalyst ink.

BACKGROUND ART

A catalyst ink including an electrically-conductive carrier with a catalyst (for example, platinum) supported thereon and an electrolyte resin is used in manufacturing an electrode for a polymer electrolyte fuel cell. Since platinum is expensive, the less content of platinum is desirable. Decreasing the content of platinum, however, lowers the power generation capability of the fuel cell. In order to prevent reduction in power generation capability, one proposed technique uses an electrolyte resin having high oxygen permeability (for example, JP2003-36856A).

In manufacturing the electrode using the catalyst ink containing such electrolyte resin having high oxygen permeability, there may be cracking occurring on the electrode when the catalyst ink is applied and dried on an electrode substrate (for example, electrolyte membrane or tetrafluoroethylene sheet). The occurrence of cracking on the electrode may cause cross leakage and lower the power generation capability of the fuel cell.

SUMMARY

In order to solve at least part of the foregoing, the object of the invention is to provide a technique that prevents the occurrence of cracking on an electrode manufactured by using a catalyst ink containing even an electrolyte resin having high oxygen permeability.

In order to achieve at least part of the foregoing, the invention provides various aspects and embodiments described below.

According to one aspect, there is provided an electrode for fuel cell, comprising: a catalyst carrier that is an electrically-conductive carrier with a catalyst supported thereon; a first electrolyte resin; and a second electrolyte resin, wherein the first electrolyte resin has oxygen permeability of less than $2.2 \times 10^{-14}$ mol/(m s Pa) in an environment having temperature of 80 degrees Celsius and relative humidity of 50%, and the second electrolyte resin has oxygen permeability of not less than $2.2 \times 10^{-14}$ mol/(m s Pa) in the environment having temperature of 80 degrees Celsius and relative humidity of 50%.

The electrode for fuel cell according to this aspect inhibits aggregation of the catalyst carrier as the electrically-conductive carrier with the catalyst supported thereon, which is caused by the structure of the second electrolyte resin having high oxygen permeability, by using the first electrolyte resin. This results in preventing the occurrence of cracking on the electrode for fuel cell.

According to one embodiment of the electrode for fuel cell, a mass fraction of the first electrolyte resin may be not less than 2% and not greater than 50% relative to a total mass of the first electrolyte resin and the second electrolyte resin.

The electrode for fuel cell according to this embodiment provides a fuel cell having high power generation capability while preventing the occurrence of cracking on the electrode.

The present invention may be implemented by diversity of aspects other than the electrode for fuel cell described above, for example, a manufacturing method of the electrode for fuel cell, a catalyst ink used in the manufacturing method, a membrane electrode assembly, a fuel cell, a moving vehicle equipped with the fuel cell, and stationary power generation equipment configured to supply electric power to a specified facility.

DESCRIPTION OF EMBODIMENTS

A. Structure of Fuel Cell

Figure 1:
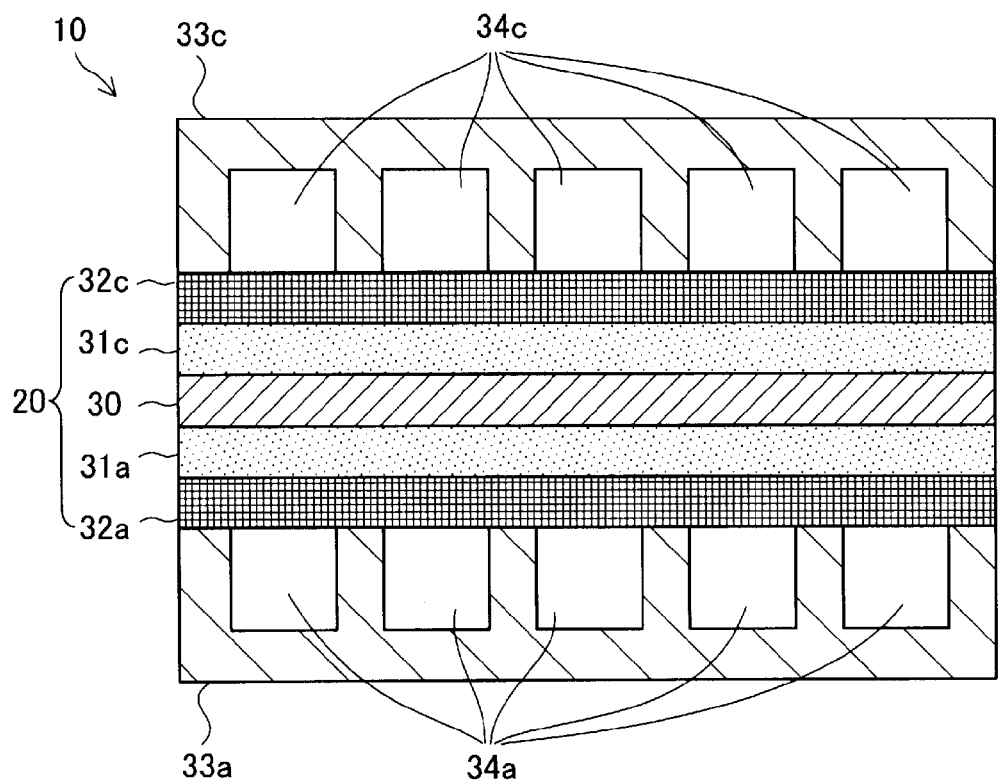
FIG. 1 is a cross sectional view illustrating the general structure of a fuel cell.

FIG. 1 is a cross sectional view illustrating the general structure of a fuel cell 10 provided as a polymer electrolyte fuel cell according to one embodiment of the invention. The fuel cell 10 includes a membrane electrode assembly 20. The membrane electrode assembly 20 includes an electrolyte membrane 30, a cathode electrode 31c and an anode electrode 31a formed on respective surfaces of the electrolyte membrane 30, and a cathode gas diffusion layer 32c and an anode gas diffusion layer 32a formed on the respective electrodes 31c and 31a. The fuel cell 10 also has a cathode-side separator 33c and an anode-side separator 33a located on the respective surfaces of the membrane electrode assembly 20. Oxidizing gas channels 34c are formed between the cathode gas diffusion layer 32c and the cathode-side separator 33c. Fuel gas channels 34a are formed between the anode gas diffusion layer 32a and the anode-side separator 33a. A membrane having good proton conductivity in the wet state may be employed for the electrolyte membrane 30. One example of such membrane is a Nafion (registered trademark) film manufactured by DuPont.

Figure 2:
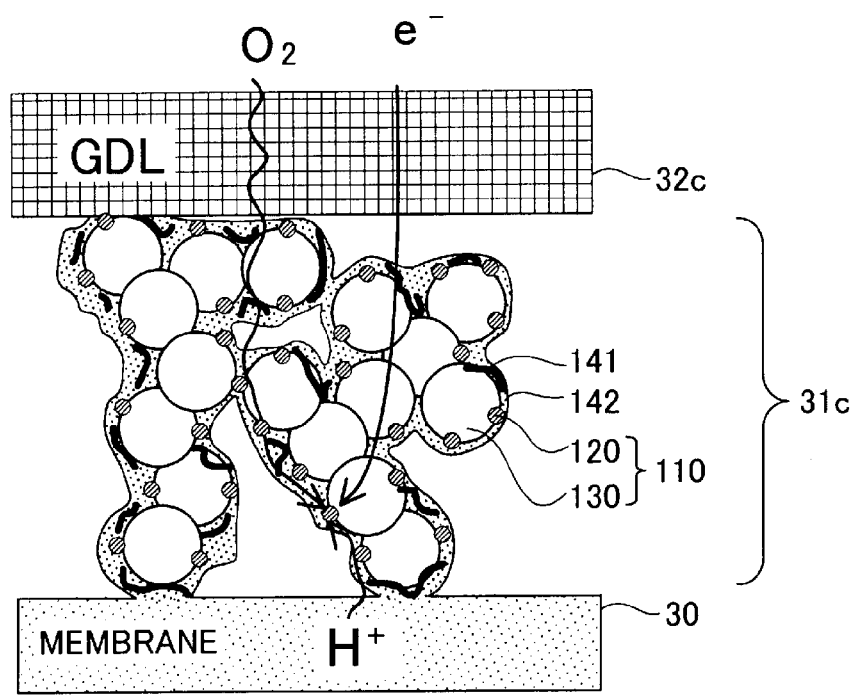
FIG. 2 schematically illustrates the structure proximity to a cathode electrode.

FIG. 2 schematically illustrates the structure proximity to the cathode electrode 31c shown in FIG. 1. The cathode electrode 31c includes catalyst-support carbon 110 prepared by making a catalyst 120 supported on a conductive carbon carrier 130, a general-type electrolyte resin 141 and a high oxygen-permeable electrolyte resin 142. According to this embodiment, the mass fraction of the general-type electrolyte resin 141 to the total mass of the general-type electrolyte resin 141 and the high oxygen-permeable electrolyte resin 142 is not less than 2% and not greater than 20%. Hereinafter this fraction is also referred to as "fraction of the general-type electrolyte resin 141". The "mass fraction" is expressed as percent by weight, which is hereinafter shown by "%" or "wt %". The general-type electrolyte resin 141 corresponds to the first electrolyte resin of the invention, and the high oxygen-permeable electrolyte resin 142 corresponds to the second electrolyte resin of the invention. In another embodiment, the mass fraction of the general-type electrolyte resin 141 to the total mass of the general-type electrolyte resin 141 and the high oxygen-permeable electrolyte resin 142 may be not less than 2% and not greater than 50%.

The high oxygen-permeable electrolyte resin 142 contains a cyclic compound having the cyclic structure as the basic skeleton as described in, for example, JP 2003-36856A to have the high oxygen permeability. The oxygen permeability of the high oxygen-permeable electrolyte resin 142 is not less than $2.2 \times 10^{-14}$ mol/(m s Pa) in an environment having the temperature of 80 degrees Celsius and the relative humidity of 50%.

The operating condition is set to the temperature of 80 degrees Celsius and the relative humidity of 50%, because of the following reason. The polymer electrolyte fuel cell is generally controlled and operated, for example, in a temperature range of 60 to 100 degrees Celsius in the ordinary state except temporary situations, such as start time and load change time, because of the properties of the solid polymer electrolyte membrane. The polymer electrolyte fuel cell is also used in a certain humidity environment, since some water content is essential for the high proton conductivity and water is produced by the electrode reaction. The oxygen permeability is accordingly defined herein at the temperature of 80 degrees Celsius and the relative humidity of 50% as the general operating condition. The electrolyte resin having the oxygen permeability described above under this operating condition has similar advantageous effects to those of the embodiment in the ordinary state except temporary situations, such as start time and load change time, even under a different operating condition other than this operating condition.

The general-type electrolyte resin 141 has less content or no content of the cyclic compound having the cyclic structure as the basic skeleton, compared with the high oxygen-permeable electrolyte resin 142. The general-type electrolyte resin 141 accordingly has lower oxygen permeability than that of the high oxygen-permeable electrolyte resin 142, i.e., the oxygen permeability of less than $2.2 \times 10^{-14}$ mol/(m s Pa) in the environment having the temperature of 80 degrees Celsius and the relative humidity of 50%. According to this embodiment, Nafion is used for the general-type electrolyte resin 141. The general-type electrolyte resin 141 is, however, not limited to Nafion but may be any electrolyte resin generally used for the electrodes for fuel cells, for example, perfluorosulfonic acid resin material, such as Aciplex (registered trademark) manufactured by Asahi Kasei Corporation or Flemion (registered trademark) manufactured by Asahi Glass Co., Ltd.

The oxygen permeability of the general-type electrolyte resin 141 or the high oxygen-permeable electrolyte resin 142 may be measured by, for example, the potential step method with a Pt microelectrode (ECS Transactions, 16(2) 881-889 (2008)) using the electrolyte resin cast-molded to a thin film of about 0.2 millimeters in thickness. The oxygen permeabilities of various electrolyte resins are measured in advance by this method or another suitable method, and the electrolyte resins having the suitable oxygen permeabilities are employed respectively for the general-type electrolyte resin 141 and the high oxygen-permeable electrolyte resin 142.

The cathode electrode 31c (FIG. 2) receives oxygen flowed through the oxidizing gas channels 34c (FIG. 1) and supplied via the cathode gas diffusion layer 32c. The cathode electrode 31c also receives proton supplied from the electrolyte membrane 30 and electron generated on the anode and supplied via the cathode gas diffusion layer 32c. The proton reaches the surface of the catalyst 120 through the general-type electrolyte resin 141 and the high oxygen-permeable electrolyte resin 142, while the electron reaches the surface of the catalyst 120 through the carbon carrier 130. The oxygen, the electron and the proton have reaction shown by Equation (1) given below:

$$O_2 + 4e^- + 4H^+ \rightarrow 2H_2O \qquad (1)$$

Figure 3:
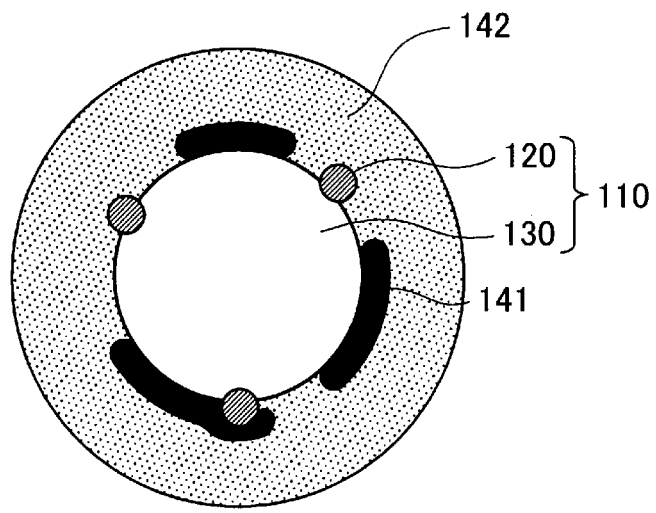
FIG. 3 is an enlarged view showing the detailed structure proximate to a catalyst-support carbon in the cathode electrode.

FIG. 3 is an enlarged view showing the detailed structure proximate to the catalyst-support carbon 110 in the cathode electrode 31c shown in FIGS. 1 and 2. As illustrated in FIG. 3, in the structure proximate to the catalyst-support carbon 110 of the cathode electrode 31c, the general-type electrolyte resin 141 coats some portions of the catalyst-support carbon 110, and the high oxygen-permeable electrolyte resin 142 further overcoats the overall catalyst-support carbon 110. This structure facilitates the oxygen contained in the oxidizing gas to reach the catalyst 120. This is because oxygen reaches the catalyst 120 uncoated with the general-type electrolyte resin 141 by passing through only the high oxygen-permeable electrolyte resin 142 but not through the general-type electrolyte resin 141. At some locations, the catalyst 120 is coated with the general-type electrolyte resin 141 in a relatively small thickness. Even at these locations, oxygen more readily reaches the catalyst 120, compared with the structure of the cathode electrode 31c coated with only the general-type electrolyte resin 141. Using the electrode of this structure facilitates the supply of oxygen to the surface of the catalyst 120 and thereby enables the reaction of Equation (1) to proceed rapidly.

The inventors have found that using the high oxygen-permeable electrolyte resin 142 as the electrolyte resin for electrodes increases the likelihood that the electrode has cracking, because of the reason described later. According to this embodiment, the general-type electrolyte resin 141 is used in addition to the high oxygen-permeable electrolyte resin 142, in order to prevent the occurrence of cracking. The fraction of the general-type electrolyte resin 141 is set to be not less than 2% and not greater than 20% as described above. The grounds for this fraction range are described later, based on the results of experiments.

The structure of the cathode electrode 31c described above is also applicable to the anode electrode 31a. According to this embodiment, the same electrodes are used for both the cathode electrode 31c and the anode electrode 31a.

B. Manufacturing Method of Electrode for Fuel Cell

Figure 4:
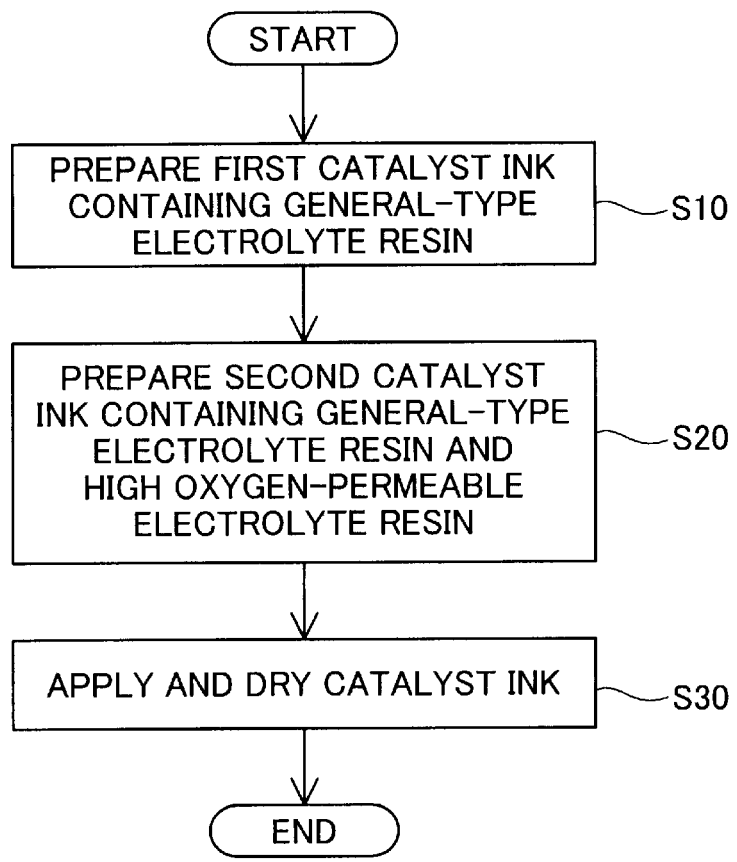
FIG. 4 is a flowchart showing a manufacturing method of an electrode for fuel cell.

FIG. 4 is a flowchart showing a manufacturing method of the electrodes (cathode electrode 31c and anode electrode 31a) of the fuel cell 10 according to the embodiment. The electrode manufacturing method first provides the catalyst-support carbon 110 having the catalyst 120 supported on the carbon carrier 130, the general-type electrolyte resin 141 and a solvent. The method mixes these components with stirring and disperses the mixture with, for example, an ultrasonic homogenizer to prepare a catalyst ink (step S10). Hereinafter the catalyst ink prepared at step S10 is called first catalyst ink. According to this embodiment, platinum is used as the catalyst 120, and acetylene black having the BET specific surface area (specific surface area measured by the BET method) of 264 $m^2/g$ is used as the carbon carrier 130. The catalyst-support carbon 110 carries 50 percent by weight of platinum. Water and ethanol are used as the solvent. Herein, the term "solvent" is not necessarily used to imply a liquid that forms a homogeneous solution, but may refer also to a carrier liquid in which solids are dissolved, partially dissolved, dispersed or suspended.

After preparing the first catalyst ink at step S10, the method subsequently mixes the first catalyst ink and the high oxygen-permeable electrolyte resin 142 with stirring to have the fraction of the general-type electrolyte resin 141 of not less than 2% and not greater than 20% and disperses the mixture with, for example, a ball mill to prepare another catalyst ink (step S20). According to this embodiment, the oxygen permeability of the high oxygen-permeable electrolyte resin 142 is not less than $2.2 \times 10^{-14}$ mol/(m s Pa). This catalyst ink prepared at step S20 is hereinafter called second catalyst ink.

The mass fraction of the general-type electrolyte resin 141 may be controlled to be not less than 2% and not greater than 20% by first determining the amount of the general-type electrolyte resin 141 to be used at step S10 and then adjusting the amount of the high oxygen-permeable electrolyte resin 142 used at step S20. Alternatively the mass fraction of the general-type electrolyte resin 141 may be controlled to be not less than 2% and not greater than 20% by first determining the amount of the high oxygen-permeable electrolyte resin 142 to be used at step S20 and then adjusting the amount of the general-type electrolyte resin 141 used at step S10.

After preparing the second catalyst ink, the method applies the prepared second catalyst ink on both surfaces of the electrolyte membrane 30 as the electrode substrate with, for example, a bar coater, and dries the applied second catalyst ink with hot blast of not lower than 60 degrees Celsius or more preferably 80 to 120 degrees Celsius (step S30). This completes production of the cathode electrode 31c and the anode electrode 31a shown in FIG. 1. The membrane electrode assembly 20 is obtained by placing the electrolyte membrane 30 with the cathode electrode 31c and the anode electrode 31a formed thereon between the cathode gas diffusion layer 32c and the anode gas diffusion layer 32a and joining these components together by, for example, hot-pressing. The fuel cell 10 is then manufactured by further joining the cathode-side separate 33c and the anode-side separator 33a with the obtained membrane electrode assembly 20 to form the oxidizing gas channels 34c and the fuel gas channels 34a. According to this embodiment, the second catalyst ink is applied on both the surfaces of the electrolyte membrane 30 as the electrode substrate. According to another embodiment, the cathode gas diffusion layer 32c and the anode gas diffusion layer 32a may be used as the electrode substrates. The catalyst ink may be applied to both the electrolyte membrane 30 and the cathode and anode gas diffusion layers 32c and 32a.

C. Results of Experiments

The following describes the grounds for setting the fraction of the general-type electrolyte resin 141 to be not less than 2% and not greater than 20%, based on the results of some experiments.

Figures 5, 6:
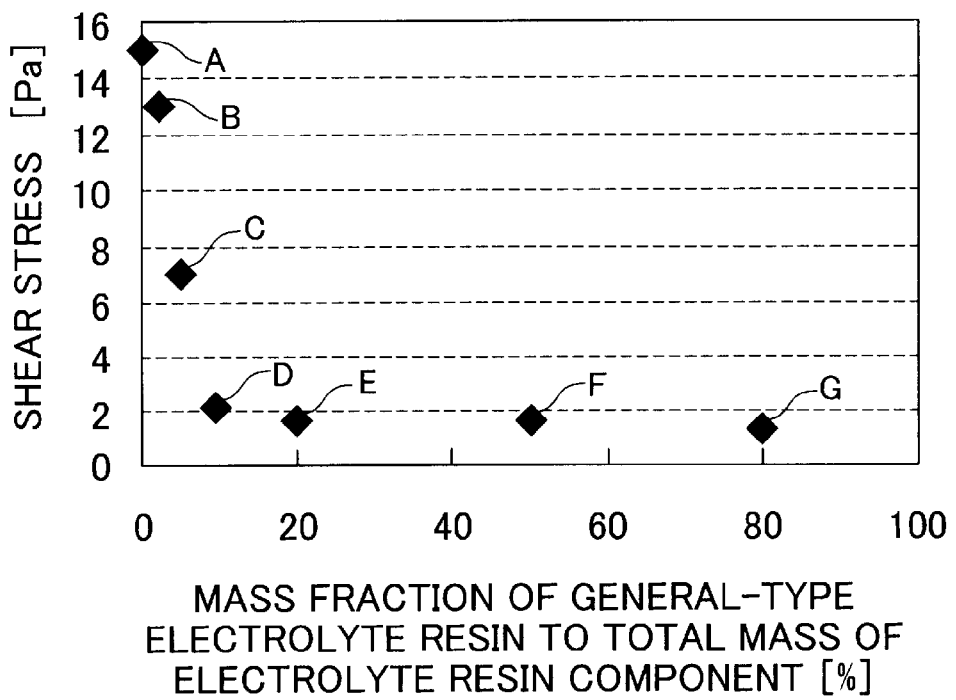
FIG. 5 is a table showing the compositions of catalyst inks used to determine the fraction of a general-type electrolyte resin.
FIG. 6 is a graph showing the measurement results of shear stress with respect to catalyst inks A to G.

FIG. 5 is a table showing the compositions of catalyst inks used to determine the fraction of the general-type electrolyte resin 141. Seven different catalyst inks A, B, C, D, E, F and G were prepared by performing the operations of steps S10 to S20 in the manufacturing method of the electrodes of the fuel cell described above. The fraction of the general-type electrolyte resin 141 was set to 0, 2, 5, 10, 20, 50 and 80% respectively in the inks A to G as shown in the table of FIG. 5. The respective inks A to G had the mass ratios of the general-type electrolyte resin 141 and the high oxygen-permeable electrolyte resin 142 to the carbon carrier 130 (Ionomer/Carbon: I/C) as shown in FIG. 5. The concentration of carbon was 4.5% in all the catalyst inks A to G. Electrodes prepared by using the same amounts of the respective catalyst inks A to G accordingly contained the same amount of platinum, i.e., the same weight of platinum per unit area. This allows investigation of the effects of only the fraction of the general-type electrolyte resin 141 on the performance of the fuel cell 10.

FIG. 6 is a graph showing the measurement results of shear stress with respect to the catalyst inks A to G prepared as described above. The viscosity of each of the catalyst inks was evaluable by measuring the shear stress. FIG. 6 shows the mass fraction of the general-type electrolyte resin 141 to the total mass of the electrolyte resin component as abscissa and the shear stress as ordinate. The shear stress of each of the catalyst inks A to G was measured by rotating a cone plate at the angular velocity of 25 (1/sec) with Haake RheoStress 6000.

According to the measurement results of shear stress of the catalyst inks A to G, the catalyst ink A containing only the high oxygen-permeable electrolyte resin 142 but not containing the general-type electrolyte resin 141 had the highest shear stress. In general, the catalyst ink having the higher shear stress has higher viscosity and poorer dispersibility. As shown in the graph of FIG. 6, the catalyst inks B to G additionally containing the general-type electrolyte resin 141 had the better dispersibility than the catalyst ink A containing only the high oxygen-permeable electrolyte resin 142. The dispersibility of the catalyst ink was improved with an increase in fraction of the general-type electrolyte resin 141 (catalyst inks B to G).

The improvement in dispersibility of the catalyst ink with an increase in fraction of the general-type electrolyte resin 141 may be attributed to the following reason. The high oxygen-permeable electrolyte resin 142 contains the cyclic compound having the cyclic structure as the basic skeleton as described above. The compound of such structure generally has the molecular chain of low movability or in other words high rigidity and accordingly has low adsorption to carbon, which may cause aggregation of carbon particles. Adding the general-type electrolyte resin 141 having less content or no content of the cyclic compound having the cyclic structure to this high oxygen-permeable electrolyte resin 142 is expected to improve the low movability, which is caused by the structure of the high oxygen-permeable electrolyte resin 142 or in other words, to decrease the rigidity. This may result in improving the dispersibility of the catalyst ink.

In order to check the occurrence of cracking in the electrodes using the respective catalyst inks A to G, each of the catalyst inks A to G was applied on the electrolyte membrane 30 with a bar coater and dried, and the surface conditions of the respective electrodes were observed. An SEM (scanning electrode microscope) was used to observe the electrode surface.

Figure 7:
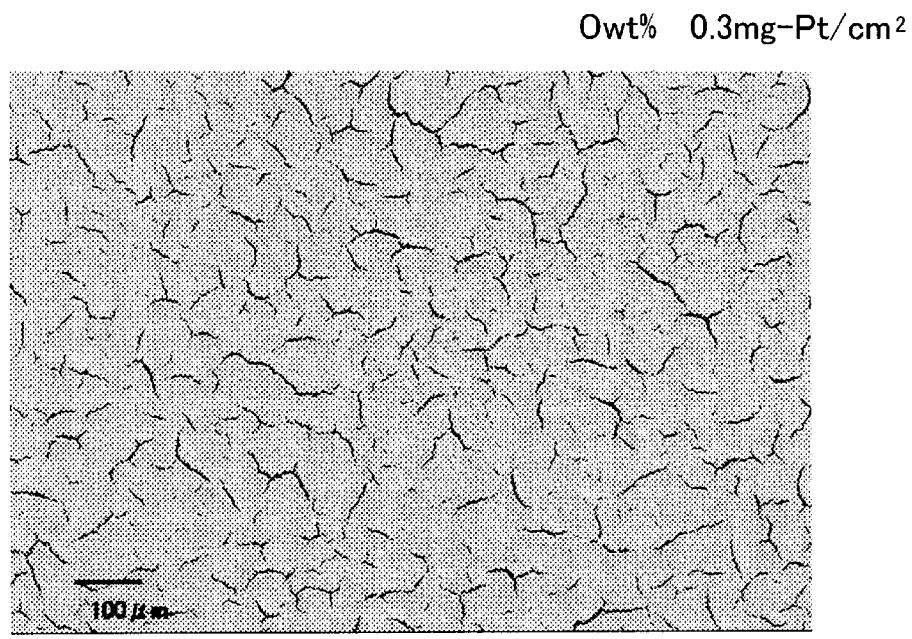
FIG. 7 is an SEM image of the surface of an electrode manufactured by using the catalyst ink A.
Figure 8:
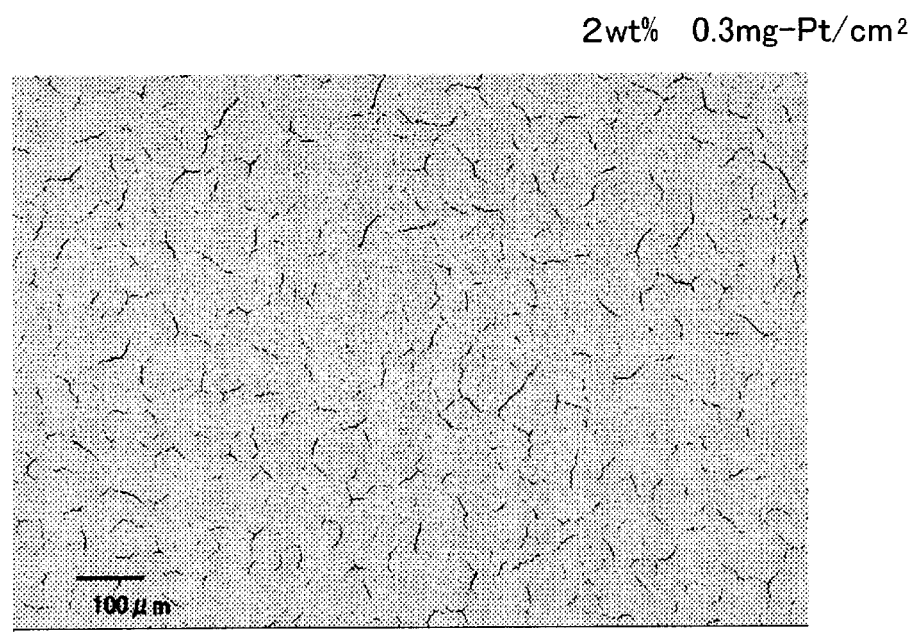
FIG. 8 is an SEM image of the surface of an electrode manufactured by using the catalyst ink B.
Figure 9:
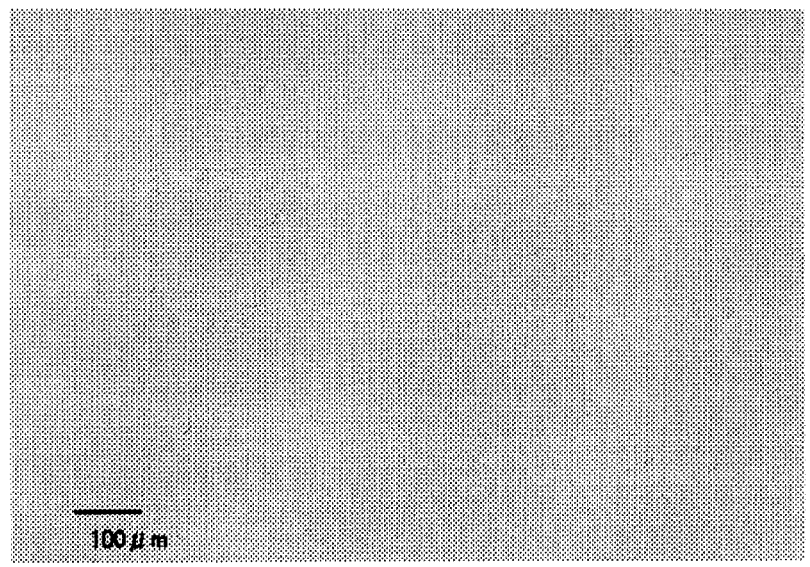
FIG. 9 is an SEM image of the surface of an electrode manufactured by using the catalyst ink C.
Figure 10:
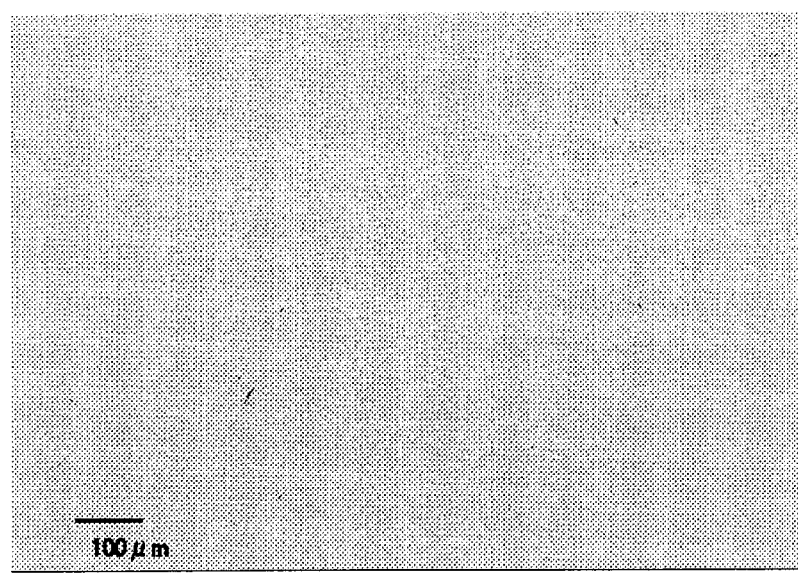
FIG. 10 is an SEM image of the surface of an electrode manufactured by using the catalyst ink D.

FIGS. 7 to 10 are SEM images of the surfaces of electrodes manufactured by respectively using the catalyst inks A to D. The content of platinum was 0.3 mg/cm$^2$ in each of the electrodes. According to the results of such observation, the surface of the electrode using the catalyst ink A had many cracks as shown in FIG. 7. The surface of the electrode using the catalyst ink B also had cracks (FIG. 8), but the degree of cracking was not as high as the electrode shown in FIG. 7. The surfaces of the electrodes using the catalyst inks C and D had substantially no cracks but had homogeneous surface condition (FIGS. 9 and 10). Electrodes were also manufactured by using the catalyst inks E, F and G, and the surface conditions of these electrodes were similarly observed. The results of observation for these electrodes had the similar tendencies to that of the electrode shown in FIG. 10.

Figure 11:
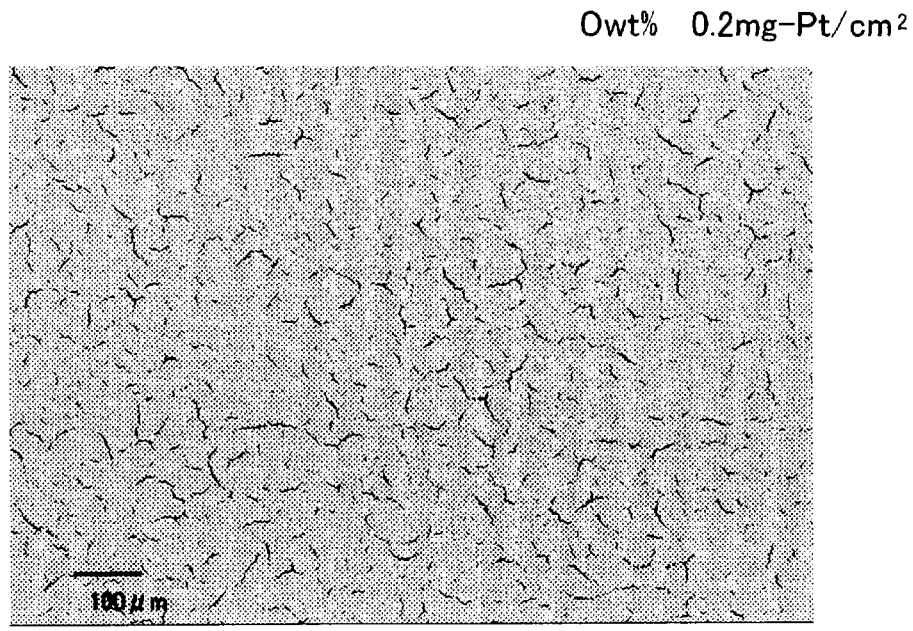
FIG. 11 is an SEM image of the surface of an electrode manufactured by using a different content of the catalyst ink A.
Figure 12:
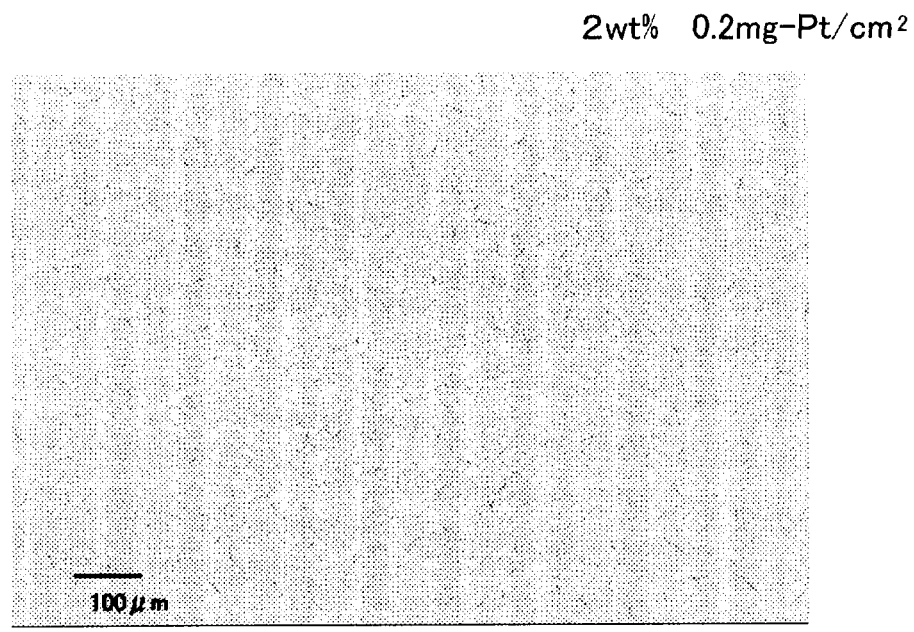
FIG. 12 is an SEM image of the surface of an electrode manufactured by using a different content of the catalyst ink B.

FIGS. 11 and 12 are SEM images of the surfaces of the electrodes manufactured by respectively using the less contents of the catalyst inks A and B. The content of platinum was 0.2 mg/cm$^2$ in these electrodes using the respective catalyst inks. As clearly understood from the comparison between FIGS. 7 and 11 (catalyst ink A) and the comparison between FIGS. 8 and 12 (catalyst ink B), with respect to the catalyst ink of the same composition, the degree of cracking decreased with a decrease in amount of the catalyst ink per unit area.

Figures 13, 14:
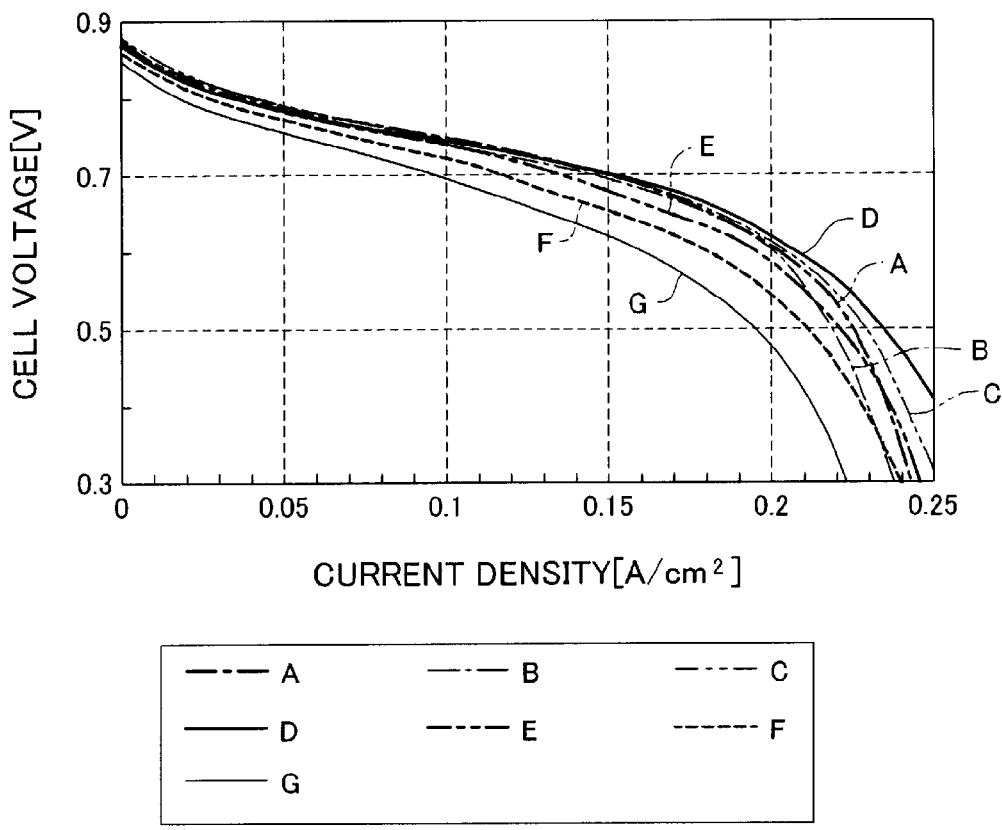
FIG. 13 is a table summarizing the results of SEM observation of the electrode surfaces.
FIG. 14 is a graph showing the current density-voltage characteristic of the fuel cells respectively using the catalyst inks A to G.

FIG. 13 is a table summarizing the results of SEM observation of the electrode surfaces described above. In the table of FIG. 13, the surface condition of each electrode was evaluated with the symbols "circle", "triangle" and "cross mark". The "circle" represents the catalyst ink that has substantially no occurrence of cracks in SEM observation and is evaluated as suitable for the catalyst ink of the fuel cell 10 by taking into account the electrode surface condition. The symbol "triangle" represents the catalyst ink that may be suitable for the catalyst ink of the fuel cell 10 by selecting the adequate amount. The symbol "cross mark" represents the other catalyst inks. As clearly understood from FIG. 13, the catalyst inks having the mass fraction of the general-type electrolyte resin 141 of not lower than 2% (catalyst inks B to G) may be suitable for the catalyst ink of the fuel cell 10 by taking into account the electrode surface condition.

The following describes the possible reason why using the catalyst inks B to G containing the general-type electrolyte resin 141 prevents the occurrence of cracking in the resulting electrodes. The high oxygen-permeable electrolyte resin 142 is rigid and has low adsorption to carbon, which may cause aggregation of carbon particles. Additionally, the structure of the high oxygen-permeable electrolyte resin 142 causes the low mobility of the polymer chains. The high oxygen-permeable electrolyte resin 142 is accordingly expected to have the less entanglement of polymer chains and low breaking strength. Applying and drying the catalyst ink A containing only the high oxygen-permeable electrolyte resin 142 of such properties as the electrolyte resin component may facilitate aggregation of carbon particles with evaporation of the solvent to have breaks at the entangled portions of the polymer chains and thereby cause cracks. Compared with the high oxygen-permeable electrolyte resin 142, the general-type electrolyte resin 141 has the higher adsorption to carbon, which inhibits aggregation of carbon particles. Additionally, the general-type electrolyte resin 141 has the higher structural breaking strength than the high oxygen-permeable electrolyte resin 142. The catalyst inks additionally containing the general-type electrolyte resin 141 (i.e., catalyst inks B to G) accordingly have the improved dispersibility, the more entanglement of polymer chains and the increased breaking strength, compared with the catalyst ink A containing only the high oxygen-permeable electrolyte resin 142. This may be the reason why the catalyst inks B to G have the lower occurrence of cracks.

An electrode of a comparative example was manufactured similarly according to the manufacturing method of FIG. 4 except preparing the catalyst ink by first providing the high oxygen-permeable electrolyte resin 142 at step S10 and then adding the general-type electrolyte resin 141 at step S20. The surface condition of this electrode was observed by the above method. The surface of the electrode of this comparative example had cracks, like the surface condition shown in FIG. 7. This is because the general-type electrolyte resin 141 contributes to improvement in dispersibility of the catalyst ink. The prior contact of the high oxygen-permeable electrolyte resin 142 with the catalyst-support carbon 110 interferes with formation of the structure shown in FIG. 3. It is accordingly preferable to prepare the catalyst ink used for the electrode by first providing the general-type electrolyte resin 141 at step S10 and then adding the high oxygen-permeable electrolyte resin 142 at step S20 in the sequence shown in FIG. 4.

FIG. 14 is a graph showing the current density-voltage characteristic of the fuel cells 10 respectively using the catalyst inks A to G. FIG. 14 shows the current density of the fuel cell 10 as abscissa and the voltage of the fuel cell 10 (also called "cell voltage") as ordinate. Seven different fuel cells 10 were manufactured by using the catalyst inks A to G having the compositions shown in FIG. 5. In the description hereinafter, the fuel cells 10 using the catalyst inks A to G are called fuel cells A to G.

Each of the fuel cells 10 was subjected to power generation with the supply of hydrogen as at a rate of 0.5 L/min as the anode gas and the supply of mixed gas containing 1% of oxygen and 99% of nitrogen at a rate of 1.0 L/min as the cathode gas, and the voltage of the fuel cell was measured against the varying current density as the current density-voltage characteristic. The gas pressure was 0.05 MPa, and both the anode gas and the cathode gas were humidified to 77 degrees Celsius by the bubbler method. The cell temperature was 80 degrees Celsius, and the electrode area was 1 cm². As shown in FIG. 14, under such conditions, the fuel cells A to E had the higher cell voltage, i.e., the higher power generation capability, than the fuel cells F and G at the current density in the range of 0 to 0.25 A/cm².

Figures 15, 16:
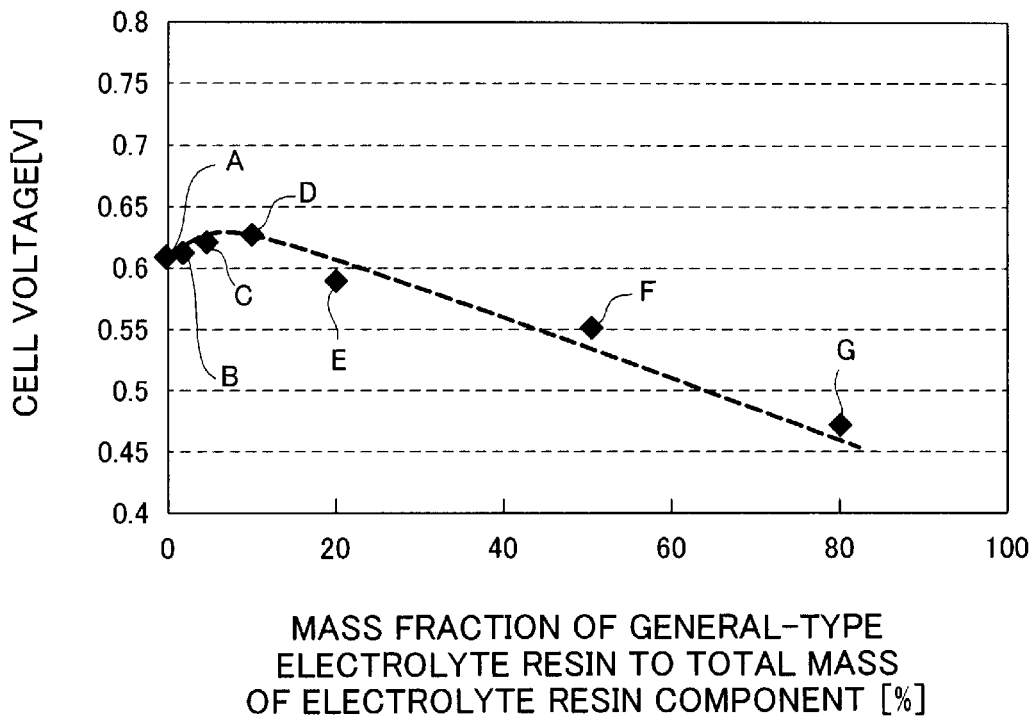
FIG. 15 is a graph showing the relationship between the fraction of a general-type electrolyte resin and the cell voltage at a current density of 0.2 A/cm$^2$.
FIG. 16 is a table showing the measured cell voltage in correlation to the fraction of the general-type electrolyte resin at the current density of 0.2 A/cm$^2$.

FIG. 15 is a graph showing the relationship between the fraction of the general-type electrolyte resin 141 and the cell voltage at the current density of 0.2 A/cm². FIG. 16 is a table showing the measured cell voltage in correlation to the fraction of the general-type electrolyte resin 141 at the current density of 0.2 A/cm². As clearly shown in FIGS. 15 and 16, the cell voltage started decreasing at the fraction of the general-type electrolyte resin 141 of not less than 20%. The cell voltage at the fraction of the general-type electrolyte resin 141 of 50% (fuel cell F) was lower by 0.04 V than the cell voltage at the fraction of the general-type electrolyte resin 141 of 20% (fuel cell E). Almost double the amount of platinum was required to compensate for the decreased cell voltage of 0.04 V by increasing the content of platinum. The high oxygen-permeable electrolyte resin 142 is more expensive than the general-type electrolyte resin 141. From the standpoints of the economical disadvantage and the cracking tendency of the high oxygen-permeable electrolyte resin 142, it is preferable to increase the content of the general-type electrolyte resin 141. Increasing the content of platinum to maintain the power generation capability is, however, economically disadvantageous, since platinum is expensive. According to these experimental results, in order to balance the power generation capability and the cost of platinum, the catalyst inks having the fraction of the general-type electrolyte resin 141 of not greater than 20% (catalyst inks A to E) are preferable as the catalyst ink used for the fuel cell 10.

With respect to each of the fuel cells 10 subjected to the above power generation capability test, the ion conductivity resistance (hereinafter also called proton resistance) of the cathode electrode 31 was measured by the AC impedance method. The AC impedance method is a known electrical conductivity evaluation method that measures the frequency characteristic of complex impedance between the cathode electrode 31c and the electrolyte resin contained in the catalyst ink that is in contact with the cathode electrode 31c via the electrolyte membrane 30. The measurement was performed by the bubbler method under the condition that both the anode gas and the cathode gas were humidified to 60 degrees Celsius.

Figure 17:
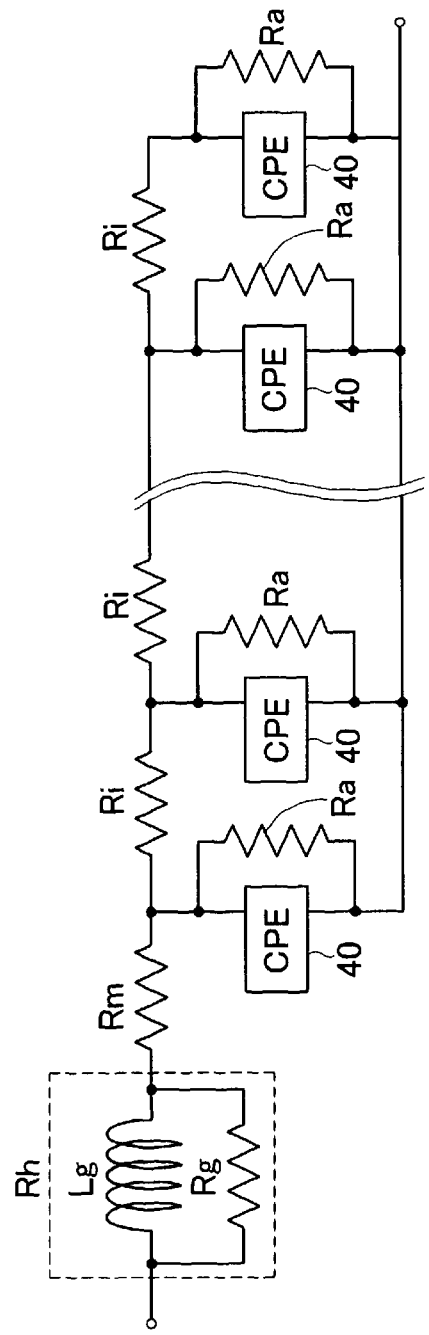
FIG. 17 illustrates an equivalent circuit.

FIG. 17 illustrates an equivalent circuit Z used to determine the ion conductivity resistance of the cathode electrode 31c. The proton resistance was determined by fitting to the AC impedance at each frequency by using this equivalent circuit Z. As illustrated in FIG. 17, the equivalent circuit Z has a membrane resistance component Rm, a correction resistance component Rh, a plurality of CPE (constant phase element) components 40, a plurality of reaction resistance components Ra and a plurality of ion conductivity resistance components Ri as circuit parameters. The membrane resistance component Rm means the resistance of the electrolyte membrane 30. The correction resistance component Rh is a pseudo resistance component based on the performance of an impedance measuring device and more specifically includes a pseudo reactance component Lg and a pseudo resistance component Rg. The CPE components 40 mean the resistances arising at the interfaces between the electrolyte resin and the carrier (catalyst-support carbon 110) in the cathode electrode 31c. The reaction resistance components Ra mean the reaction resistances arising by the reaction of the leaked gas in the presence of the catalyst 120 of the cathode electrode 31c, when hydrogen (active gas) moves from the anode electrode 31a through the electrolyte membrane 30 to the cathode electrode 31c as leaked gas in the membrane electrode assembly 20. The ion conductivity resistance components Ri mean the ion conductivity resistances of the electrolyte resins contained in the cathode electrode 31c. The sum of the ion conductivity resistance components Ri corresponds to the ion conductivity resistance of the cathode electrode 31c. Computation of the ion conductivity resistances using the equivalent circuit Z may follow the detailed procedure described in, for example, JP 2010-262896A.

Figures 18, 19:
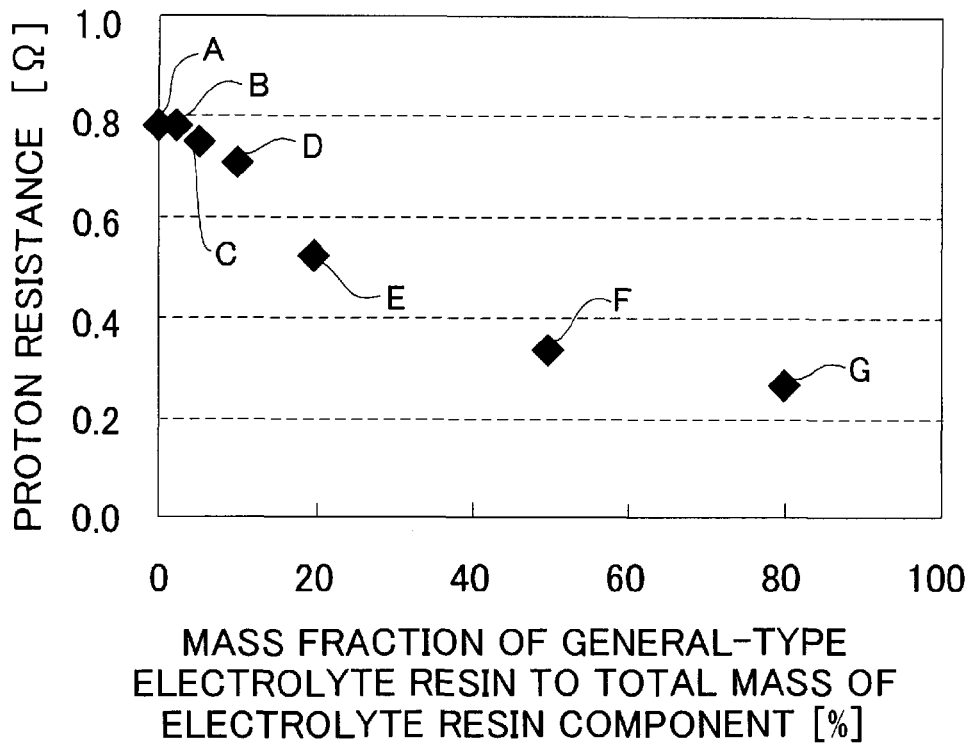
FIG. 18 is a graph showing the proton resistance of the cathode electrode.
FIG. 19 is a table summarizing the power generation capability of the fuel cell and the electrode surface condition in correlation to the fraction of the general-type electrolyte resin.

FIG. 18 is a graph showing the proton resistance of the cathode electrode 31c. The proton resistance was calculated from the ion conductivity resistance component Ri determined for the AC impedance at each frequency by using the equivalent circuit Z of FIG. 17. FIG. 18 shows the fraction of the general-type electrolyte resin 141 as abscissa and the proton resistance as ordinate. Compared with the catalyst ink A without addition of the general-type electrolyte resin 141, the catalyst inks B to G with addition of the general-type electrolyte resin 141 had the lower proton resistances. This result indicates that addition of the general-type electrolyte resin 141 lowers the proton resistance of the cathode electrode 31c.

In general, the magnitude of the proton resistance of the cathode electrode 31c depends on the amount of sulfonate group included in the electrolyte resin contained in the electrode. Even when the electrode containing only the high oxygen-permeable electrolyte resin 142 has approximately the same amount of sulfonate group as that of the electrode containing only the general-type electrolyte resin 141, however, the electrode containing only the high oxygen-permeable electrolyte resin 142 is thought to have the higher proton resistance, since the cyclic structure of the high oxygen-permeable electrolyte resin 142 works as the barrier of ion conduction. Adding the general-type electrolyte resin 141 to the high oxygen-permeable electrolyte resin 142 is thus expected to lower the proton resistance, compared with the electrode manufactured with the catalyst ink containing only the high oxygen-permeable electrolyte resin 142.

D. Conclusions

FIG. 19 is a table summarizing the power generation capability of the fuel cell 10 and the electrode surface condition (evaluation for cracking) in correlation to the fraction of the general-type electrolyte resin 141. As clearly shown in FIG. 19, by taking into account the electrode surface condition, the catalyst inks B to G, i.e., the catalyst inks having the mass fraction of the general-type electrolyte resin 141 of not less than 2%, are preferable as the catalyst ink used for the fuel cell 10. By taking into account the power generation capability, on the other hand, the catalyst inks A to E, i.e., the catalyst inks having the mass fraction of the general-type electrolyte resin 141 of not greater than 20%, are preferable as the catalyst ink used for the fuel cell 10. In order to satisfy both the good electrode surface condition and the high power generation capability, these results indicate that the mass fraction of the general-type electrolyte resin 141 is preferably in the range of not less than 2% and not greater than 20%.

As described above, the catalyst ink of the embodiment is prepared to contain both the general-type electrolyte resin 141 and the high oxygen-permeable electrolyte resin 142. The high oxygen permeability of the high oxygen-permeable electrolyte resin 142 facilitates oxygen to reach the catalyst 120 even under the condition of a small content of platinum and thereby prevents reduction in power generation capability. The catalyst ink of this embodiment contains the general-type electrolyte resin 141 and thereby suppresses cracking on the electrode caused by aggregation of carbon particles, which occurs when only the high oxygen-permeable electrolyte resin 142 is used as the electrolyte resin component. Controlling the mass fraction of the general-type electrolyte resin 141 to be not less than 2% and not greater than 20% provides the fuel cell having the high power generation capability while advantageously preventing the occurrence of cracking on the electrode.

E. Modifications

The invention is not limited to the above embodiment but various modifications and variations may be made to the embodiment without departing from the scope of the invention. Some examples of possible modifications are given below.

Platinum is used as the catalyst according to the above embodiment, but the catalyst of the invention is not limited to platinum. Other available examples of the catalyst include noble metals such as gold, silver, ruthenium, rhodium, palladium, osmium and iridium, base metals such as iron, nickel, manganese, cobalt, chromium, copper, zinc, molybdenum, tungsten, germanium and tin, alloys of such noble metals and base metals, and various metal compounds such as metal oxides and metal complexes.

The ultrasonic homogenizer and the ball mill are respectively used at steps S10 and S20 to prepare the first catalyst ink and the second catalyst ink. Other equipment, for example, a jet mill, a vibrating ball mill and a micro-cutter may be used for the same purpose.

The catalyst ink may be applied on the electrolyte membrane 30, for example, by the doctor blade method, screen printing, spray printing, or inkjet printing.

The catalyst ink having a different composition from that of the catalyst ink of the above embodiment may be used as the catalyst ink for the anode electrode 31a. For example, the catalyst ink containing only the general-type electrolyte resin 141 may be used for the anode electrode 31a.

Acetylene black is used as the carbon carrier 130 according to the above embodiment, but the carbon carrier 130 of the invention is not limited to acetylene black. Other available examples for the carbon carrier 130 include Ketjen Black EC (manufactured by Ketjen Black International Company) and Vulcan (manufactured by Cabot Japan K.K.) According to another embodiment, the catalyst-support carbon 110 of a desired composition may be prepared from the catalyst 120 and the carbon carrier 130. The carrier used to support the catalyst is not limited to carbon but may be any of other various carriers having the electrical conductivity.

The mass fractions of the general-type electrolyte resin 141 and the high oxygen-permeable electrolyte resin 142 contained in the catalyst ink used for the electrode manufactured according to the above embodiment may be determined by, for example, GC-MS (gas chromatography mass spectrometry) of the catalyst ink component eluted with a solvent from the membrane electrode assembly 20 when the general-type electrolyte resin 141 and the high oxygen-permeable electrolyte resin 142 have known compositions. The method of analysis is, however, not limited to GC-MS but may be any other suitable method.

The invention claimed is:

1. An electrode for fuel cell, comprising:
   a catalyst carrier that is an electrically-conductive carrier with a catalyst supported thereon;
   a first electrolyte resin; and
   a second electrolyte resin, wherein
   the first electrolyte resin has oxygen permeability of less than $2.2 \times 10^{-14}$ mol/(m s Pa) in an environment having temperature of 80 degrees Celsius and relative humidity of 50%, and
   the second electrolyte resin has oxygen permeability of not less than $2.2 \times 10^{-14}$ mol/(m s Pa) in the environment having temperature of 80 degrees Celsius and relative humidity of 50%,
   a mass fraction of the first electrolyte resin is not less than 2% and not greater than 50% relative to a total mass of the first electrolyte resin and the second electrolyte resin.

2. A manufacturing method of an electrode for fuel cell, comprising the steps of:
   preparing a first catalyst ink by dispersing a catalyst carrier that is an electrically-conductive carrier having at least a catalyst supported thereon and a first electrolyte resin in a solvent;
   preparing a second catalyst ink by additionally dispersing a second electrolyte resin in the first catalyst ink; and
   applying the second catalyst ink on an electrode substrate and evaporating at least part of the solvent included in the second catalyst ink, wherein
   the first electrolyte resin has oxygen permeability of less than $2.2 \times 10^{-14}$ mol/(m s Pa) in an environment having temperature of 80 degrees Celsius and relative humidity of 50%, and
   the second electrolyte resin has oxygen permeability of not less than $2.2 \times 10^{-14}$ mol/(m s Pa) in the environment having temperature of 80 degrees Celsius and relative humidity of 50%,
   the step of preparing the first catalyst ink or the step of preparing the second catalyst ink controls a mass fraction of the first electrolyte resin to be not less than 2% and not greater than 50% relative to a total mass of the first electrolyte resin and the second electrolyte resin.

3. A polymer electrolyte fuel cell, comprising the electrode for fuel cell according to claim 1.

4. A catalyst ink, comprising a catalyst carrier that is an electrically-conductive carrier with a catalyst supported thereon, a first electrolyte resin, a second electrolyte resin and a solvent, wherein
   the first electrolyte resin has oxygen permeability of less than $2.2 \times 10^{-14}$ mol/(m s Pa) in an environment having temperature of 80 degrees Celsius and relative humidity of 50%, and
   the second electrolyte resin has oxygen permeability of not less than $2.2 \times 10^{-14}$ mol/(m s Pa) in the environment having temperature of 80 degrees Celsius and relative humidity of 50%,
   a mass fraction of the first electrolyte resin is not less than 2% and not greater than 50% relative to a total mass of the first electrolyte resin and the second electrolyte resin.

5. An electrode for fuel cell, comprising:
   a catalyst carrier that is an electrically-conductive carrier with a catalyst supported thereon;

a first electrolyte resin; and
a second electrolyte resin, wherein
the first electrolyte resin partially coats the catalyst carrier, and
the second electrolyte resin coats a portion of the catalyst carrier that is not coated with the first electrolyte resin, and the first electrolyte resin,
the first electrolyte resin has oxygen permeability of less than $2.2 \times 10^{-14}$ mol/(m s Pa) in an environment having temperature of 80 degrees Celsius and relative humidity of 50%, and the second electrolyte resin has oxygen permeability of not less than $2.2 \times 10^{-14}$ mol/(m s Pa) in the environment having temperature of 80 degrees Celsius and relative humidity of 50%, a mass fraction of the first electrolyte resin is not less than 2% and not greater than 50% relative to a total mass of the first electrolyte resin and second electrolyte resin.

6. A polymer electrolyte fuel cell, comprising the electrode for fuel cell according to claim 5.

7. A manufacturing method of an electrode for fuel cell, comprising the steps of:
preparing a first catalyst ink by dispersing a catalyst carrier that is an electrically-conductive carrier having at least a catalyst supported thereon and a first electrolyte resin in a solvent;
preparing a second catalyst ink by additionally dispersing a second electrolyte resin in the first catalyst ink; and
applying the second catalyst ink on an electrode substrate and evaporating at least part of the solvent included in the second catalyst ink, wherein
the first electrolyte resin partially coats the catalyst carrier, and
the second electrolyte resin coats a portion of the catalyst carrier that is not coated with the first electrolyte resin, and the first electrolyte resin,
the first electrolyte resin has oxygen permeability of les than $2.2 \times 10^{-14}$ mol/(m s Pa) in an environment having temperature of 80 degrees Celsius and relative humidity of 50%, and the second electrolyte resin has oxygen permeability of not less than $2.2 \times 10^{-14}$ mol/(m s Pa) in the environment having temperature of 80 degrees Celsius and relative humidity of 50%, a mass fraction of the first electrolyte resin is not less than 2% and not greater than 50% relative to a total mass of the first electrolyte resin and second electrolyte resin.

8. A catalyst ink, comprising a catalyst carrier that is an electrically-conductive carrier with a catalyst supported thereon, a first electrolyte resin, a second electrolyte resin and a solvent, wherein
the first electrolyte resin partially coats the catalyst carrier, and
the second electrolyte resin coats a portion of the catalyst carrier that is not coated with the first electrolyte resin, and the first electrolyte resin,
the first electrolyte resin has oxygen permeability of less than $2.2 \times 10^{-14}$ mol/(m s Pa) in an environment having temperature of 80 degrees Celsius and relative humidity of 50%, and the second electrolyte resin has oxygen permeability of not less than $2.2 \times 10^{-14}$ mol/(m s Pa) in the environment having temperature of 80 degrees Celsius and relative humidity of 50%, a mass fraction of the first electrolyte resin is not less than 2% and not greater than 50% relative to a total mass of the first electrolyte resin and second electrolyte resin.

* * * * *